Patented Sept. 8, 1936

2,054,046

UNITED STATES PATENT OFFICE 2,054,046

UNDERGROUND ELECTRIC POWER TRANSMISSION BY ELECTRIC CABLES

Wilhelm Vogel, Cologne-Mulheim, Germany, assignor, by mesne assignments, to Protona A. G., Basel, Switzerland Application May 29, 1931, Serial No. 541,075
In Germany June 12, 1930

1 Claim. (Cl. 247—3)

In the U. S. patent to Hochstadter No. 1,849,624 of March 15, 1932 a fundamental method has been described which is based upon the experimental finding that the di-electric of electric cables can be improved if it is put under pressure and this also in the case when the pressure medium and the di-electric are not in direct contact but separated from each other by some appropriate wall.

Now practical experiments with such cables have shown that gases are particularly suitable as pressure media and that in practice a particularly simple form of said wall forming membrane or diaphragm between the di-electric and the pressure medium may be obtained by enveloping the di-electric with a seamless wall of lead or a similar pliant material. As a matter of fact, the action of an appropriately chosen pressure which improves the quality of the di-electric is easily transmitted through walls of lead of 1 to several millimetres' thickness, whereby no higher pressure is necessary than such lying within easily attainable limits. For instance, a pressure of 5-15 atms. has been applied with success.

This invention relates to a further improvement of the invention contained in said Hochstadter patent and more particularly with reference to the construction of the pressure channels in the case when a cable is drawn into sufficiently resistant ducts. It has been found that in such a case if use is made of ducts of favourable construction it is possible to obtain not only sufficient mechanical rigidity with regard to the pressure but also a pressure channel which will be sufficiently liquid- and gas-tight, this being particularly true if the duct is formed by steel pipes which are welded together. By this means a separate outer protective lead sheath and a reinforcing armour become superfluous and it is only necessary to choose the lead covering, placed on the di-electric and forming the membrane between the latter and the pressure medium, of sufficient thickness to avoid mechanical damage to said lead covering during the pulling of the cable and also too high a density of return currents in the case of cable faults. Both results may, of course, be obtained also by other means than by an increase in the thickness of the lead covering beyond the value which is necessary for its manufacture and its purpose as a sufficiently impervious and pliant membrane or diaphragm. For instance, the lead covering may be protected by some wrapping or outside coating. Furthermore, wires or strands of iron, steel, etc. may be employed and so arranged with or in the cable that they facilitate its pulling and special conductors may be provided for extra high return currents, for which latter purpose the pressure ducts may also be partly used if they are of metal.

It is known in underground cables to place bare or insulated conductors in pipes and maintain them therein by insulating distance pieces so that the pipes can be filled with a material which is intended, together with the insulating distance pieces, to form a satisfactory electric insulation between the conductors and the pipes for maintaining the working pressure. In such a case it is difficult or practically impossible to pull a considerable length of cable into the pipes on account of the friction of the distance pieces. In contradistinction thereto, according to the present invention, no insulating distance pieces are employed. The cable is pulled directly into the pipe line and in contact with the latter without the intention of maintaining an insulation for the electrical operating pressure between the cable and the pipe line. The pressure medium contained in the pipe line is not used as an insulating material but for maintaining the pressure. It will thus be seen that according to the present invention great lengths of cables, up to 1000 yards and more, can be pulled in a pipe line without the use of insulating distance pieces.

The invention consists in an underground installation for the transmission of electric power in which an electric cable is placed in a gas-tight pressure pipe line which also contains a pressure medium, the electric cable having an insulation and an impervious and pliant covering forming a wall around the said insulation, the latter being compressed by the pressure medium through the impervious and pliant covering separating it from the said pressure medium.

In Figures 1, 2, and 3 three forms of carrying out the invention are shown by way of example.

Figure 1:
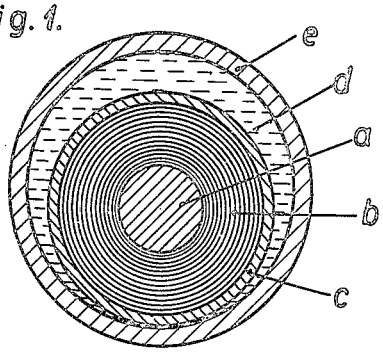
Figure 1 shows a single-conductor cable drawn into a liquid- or gas-tight duct.

In Figure 1 $a$ is the metal conductor of the single core cable, $b$ its di-electric, $c$ the enveloping wall, for instance in the form of a lead sheath, $d$ the pressure medium in the pressure channel and $e$ the pressure pipe line itself. In this case the latter is supposed to consist of substantially inflexible steel pipes of circular cross-section, the individual pipes being welded together, for instance by electric or autogenous means and the cable possesses the usual degree of flexibility to enable the pulling thereof into the pipe line.

Figure 2:
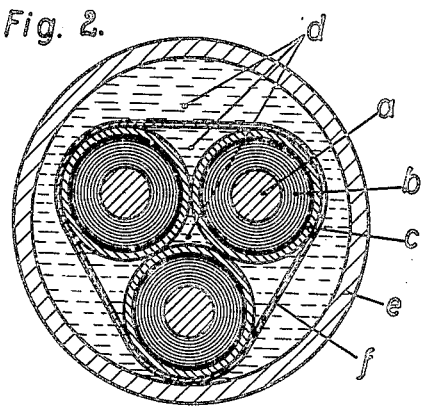
Figure 2 shows how a three-core cable, consisting of three single core cables which are bound together, is laid out into such a gas-tight pressure channel.

The references in Figure 1 apply to the same parts in Figure 2, with the exception that in Figure 2 three single-conductor cables are shown held together by a tape $f$. This tape $f$ may consist of a metal tape or of a textile band with or without interwoven metal wires or it may be carried out in some other way, so that it holds the three single conductor cables safely together before they are pulled into the pipe line $e$. Filling material between the single-conductor cables is not necessary. In order to give the pressure medium easier access the tape $f$ may, of course, also be perforated, particularly if it is made of metal and applied in the form of a closed spiral.

It is evident that the three single-conductor cables or two or a greater number of such cables may also be drawn separately into the pipe line $e$, in which case it will also be necessary to provide adequate means in order to avoid damaging of the lead covering $c$ by the sliding of the cables on one another. Such means may be provided in different ways, for instance by greasing the cable, by mechanical protecting sheaths round the lead covering $c$ or in other ways.

Of course, a great smoothness of the inner surface of the pipe line $e$ is very desirable in order to facilitate the drawing-in of the cables, also a particular form may be given to the inside of the duct-line $e$ in order to reduce the friction when the cables are pulled in.

The simplest form for the coverings $c$ is to manufacture them with the usual means as seamless lead tubes of adequate wall thickness. But other forms are equally possible for these coverings; for instance, in the case of metallized cores the coverings $c$ may be carried out in any suitable way, metallic or not as indicated in the above-mentioned patent to Hochstadter; such cables may be provided with an outside metallic sheath in tape form or otherwise of sufficient thickness to carry return currents.

Cables containing two or more conductors may be provided with one single wall $c$ surrounding all the cores and separating their insulation from the pressure medium; preferably this wall-forming membrane may consist of lead covering the whole multi-conductor cable. Such a multi-conductor cable and its covering $c$ may be of circular cross-section. However, a particular advantage may be obtained by giving the cable with its envelope a polygonal form of cross-section, for instance, according to U. S. patent to Sonnenfeld, No. 1,838,332 of Dec. 29, 1931. Beyond the advantages claimed in the latter patent for this particular form of cross-section, the latter affords considerable further advantages if employed in combination with this invention. This may be explained by the fact that the covering $c$ forming membrane between the insulation of the cable and the pressure medium serves this purpose better in polygonal shape than in circular shape, because the flat parts are more easily deformed and therefore transmit the pressure more easily than the circular parts and furthermore, because this transmission of pressure is also facilitated by a smaller quantity of fillers between the insulated cores and the membrane $c$.

Figure 3:
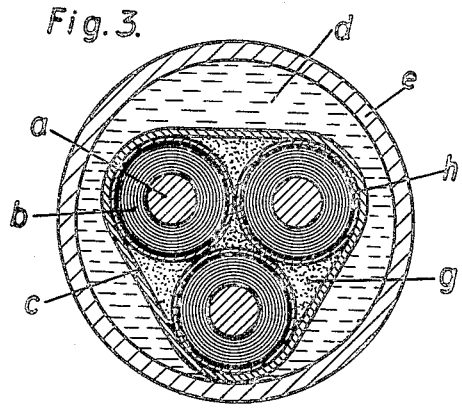
Figure 3 shows a three-core cable with a common overall lead envelope laid out in a gas-tight pressure channel.

Figure 3 shows such a three-core cable. The reference letters $a$, $b$, $c$, $d$, and $e$ apply to the same parts as in Figure 1. Such a cable, within its covering $c$, may be of any known construction. The three insulated cores $a$, $b$, may be stranded together with or without a belt insulation in the latter case the cores will preferably be metallized according to U. S. Patent No. 1,199,789, dated October 3, 1916. The figure shows the latter case of a three-core cable, the metallization of the core-surfaces being shown as $h$. $g$ represents the fillers which it will be found convenient to manufacture as hard as possible for the purpose of this invention in order to facilitate the transmission of pressure from the covering $c$ to the core insulation $b$. The figure shows that the flat parts of the triangular membrane $c$ will give way more easily to a moderate pressure acting from $d$ than a circular shaped structure and that in this way a most uniform and easy transmission of pressure to the three cores may be obtained. It is also clear that this action will be the more complete, the less filling material is to be passed by the pressure and that the triangular cross-section is thus more favourable than the circular one and that it may be of advantage to reduce the quantity of fillers further, thus giving the flat parts of the covering $c$ an inward bend in the manufacture.

The gas-tight pipe lines are shown in the drawing, by way of example, to be of circular cross-section, without however excluding other suitable forms for these ducts. The pipes will be protected against corrosion by the known means; they may therefore be coated outside and also inside with products containing tar or bitumen or they may be wrapped with impregnated fabrics. The pipes may also be lead coated and the pipe line is preferably formed by welding the pipes together.

The laying of the cables into the pressure pipe line may be carried out in many different ways. For instance, the pipe line may be prepared in sections of adequate lengths and the several manufacturing lengths of the cable may be pulled in by known means of pulling cables into ducts. However, it is also possible to proceed in such a way that the cable lengths are first laid into the cable ditch and that afterwards prepared parts of the pipe line or even the individual pipes separately may be pulled over the cable and welded together after having been put in place. In the latter case means will of course be provided, for instance asbestos lining, to avoid damaging the cable at the welds. Of course, both these and still other methods of laying may be applied together.

As may be concluded from the above description, this invention may be used with advantage in the widest scope and for cables of the most different structure, for instance, for single-conductor and multi-conductor cables, the latter with or without belt insulation, also for multi-conductor cables consisting of several separately lead-covered cores and furthermore this invention may be used quite independent of the manner in which the conductor and the insulation of the cable are constructed and manufactured; therefore, for instance if the cable contains solid or hollow conductors, impregnated paper insulation or other types of insulation, if compound, is used for the impregnation or if the cables are oil-filled.

As to the pipe lines themselves, the experience gained and the art established for such pipe lines for other purposes, for instance as gas conduits, may be used of course, in combination with this invention, more particularly as regards their laying, jointing, precaution against expansion, breaks, etc.

Having now described my invention, what I claim as new and desire to secure by Letters Patent is:—

In an electric cable system, a pipe, a cable loosely contained in said pipe, a pressure medium in said pipe and surrounding said cable, said cable consisting of a plurality of conductors and a pliant sheath, having a substantially polygonal section surrounding and receiving the insulated conductors in the angles thereof, the polygonal form of said sheath providing easily deformable substantially flat areas subjected to the influence of the pressure medium and affording diaphragm action under conditions of expansion and contraction of the insulated conductors under varying load.

WILHELM VOGEL.